United States Patent Office.

S. JOHN CARROLL, OF BALTIMORE, MARYLAND.

Letters Patent No. 61,316, dated January 22, 1867.

IMPROVEMENT IN PRESERVING GREEN CORN.

*The Schedule referred to in these Letters Patent and making part of the same.*

TO ALL WHOM IT MAY CONCERN:

Be it known that I, S. JOHN CARROLL, of Baltimore, in the county of Baltimore, and State of Maryland, have made a new and useful Improvement in Preserving Green Corn; and I hereby declare the following to be a full and exact description of the same.

Heretofore green corn has been preserved either by drying it or by the usual process of canning in hermetically sealed vessels. The first mode fails to preserve the juices of the corn, and the second, besides being expensive, injures the flavor of the corn.

My improvement consists in preserving green corn by putting it in a pickle or salt brine. By this process all the natural juices are kept in the corn, and when to be used, it is only necessary to soak it in fresh water, in order to remove any excess of salt, and it will then be found to be well preserved, and will furnish, when cooked, a fresh, juicy, and palatable article of food. By this process I produce a new and valuable article of commerce.

The following description will enable any one skilled in the art to practise my invention.

I take ears of Indian corn in the milk state, with the husks on, and put them in a can, cask, barrel, firkin, or other suitable vessel, and cover them with a brine made by dissolving about two and a half pounds of salt to each gallon of water. I prefer to leave the husks on, or part of them; but this is not indispensable. Nor do I limit myself to the strength of brine above stated, since this may be varied to suit the climate or other conditions required. When the corn is to be used, it should be soaked in fresh water for about twelve hours, more or less, to remove any excess of salt. It may then be cooked and served up in the same manner as green corn just from the stalk.

Having thus described my invention, what I claim, and desire to secure by Letters Patent of the United States, is—

Preserving green corn in the manner substantially as herein set forth and described.

I also claim the new article of manufacture and commerce, green corn, preserved substantially as herein set forth and described.

S. JOHN CARROLL.

Witnesses:
    EDM. F. BROWN,
    A. MOORE.